July 31, 1962  R. B. PALMITER  3,047,851
ELECTRONIC CHARACTER GENERATING AND DISPLAYING APPARATUS
Filed March 21, 1958  7 Sheets-Sheet 1
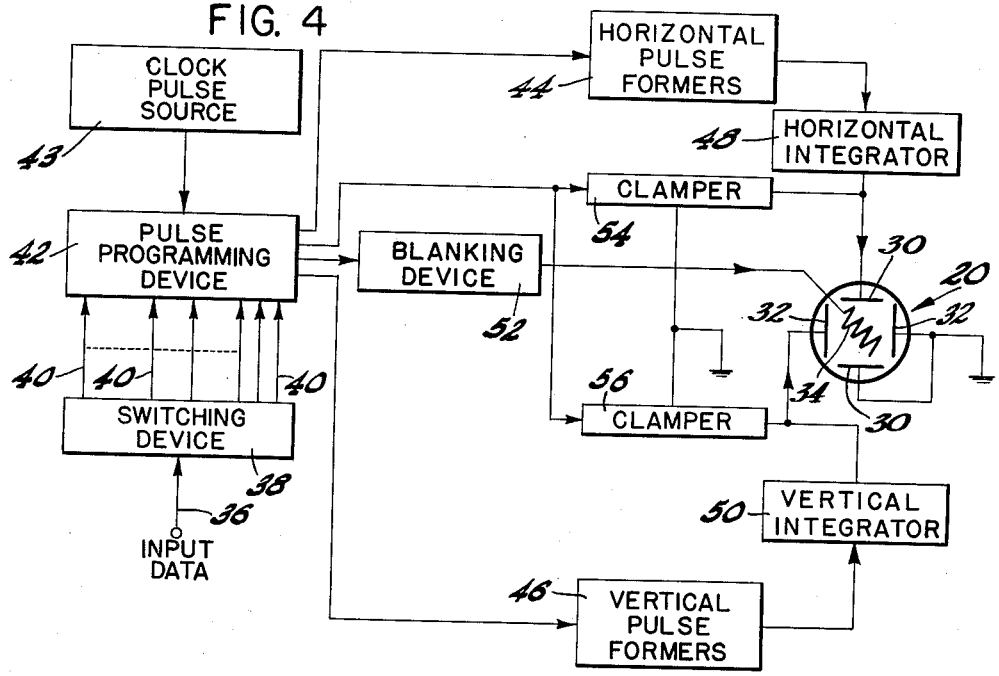
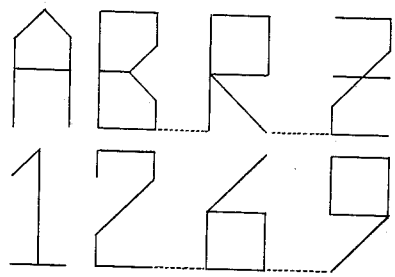
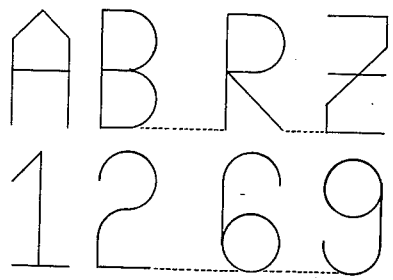
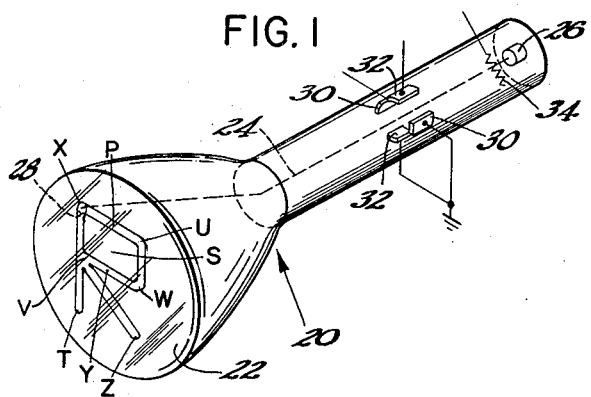
*INVENTOR.*
RUSSELL B. PALMITER
BY
ATTORNEY

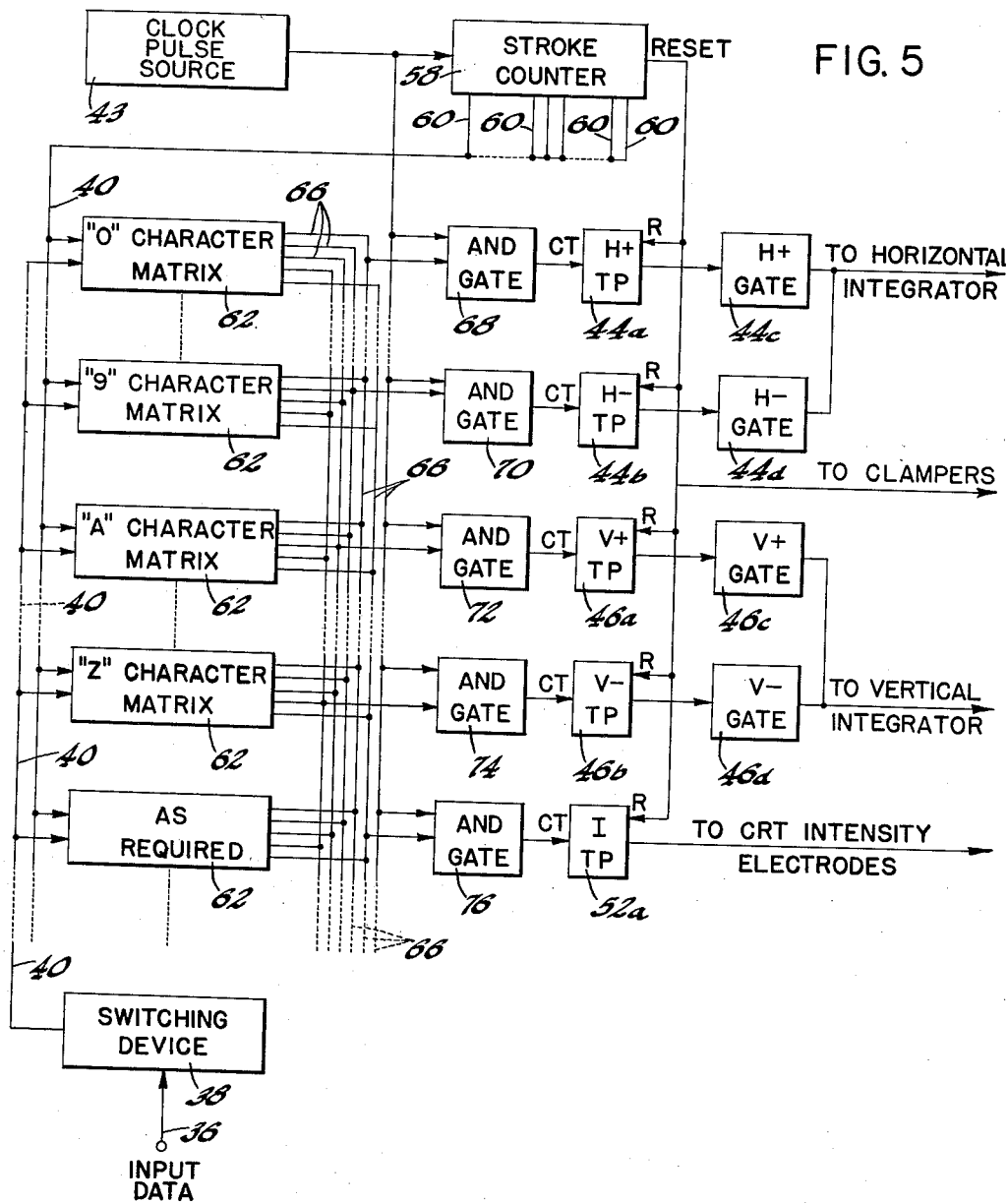

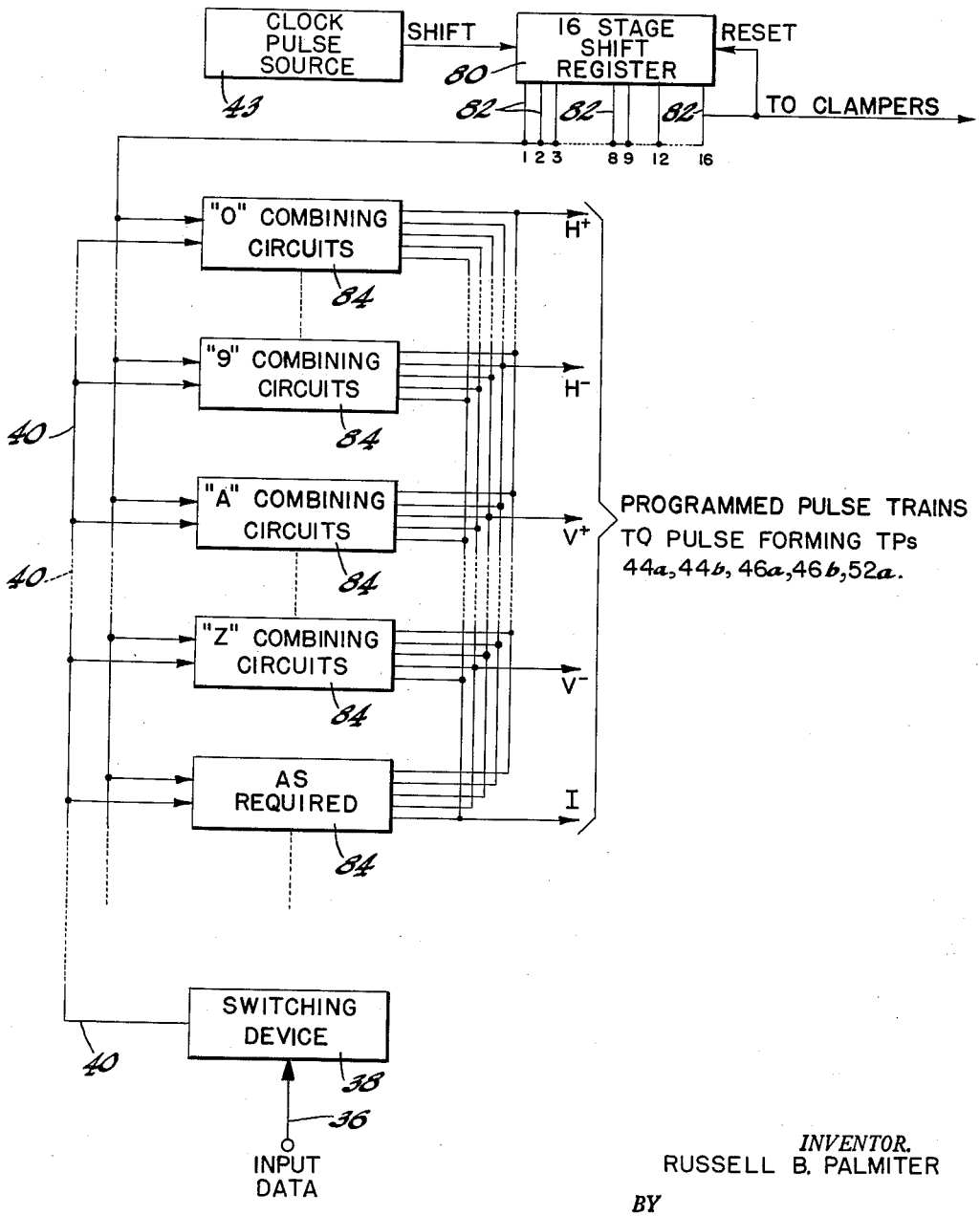

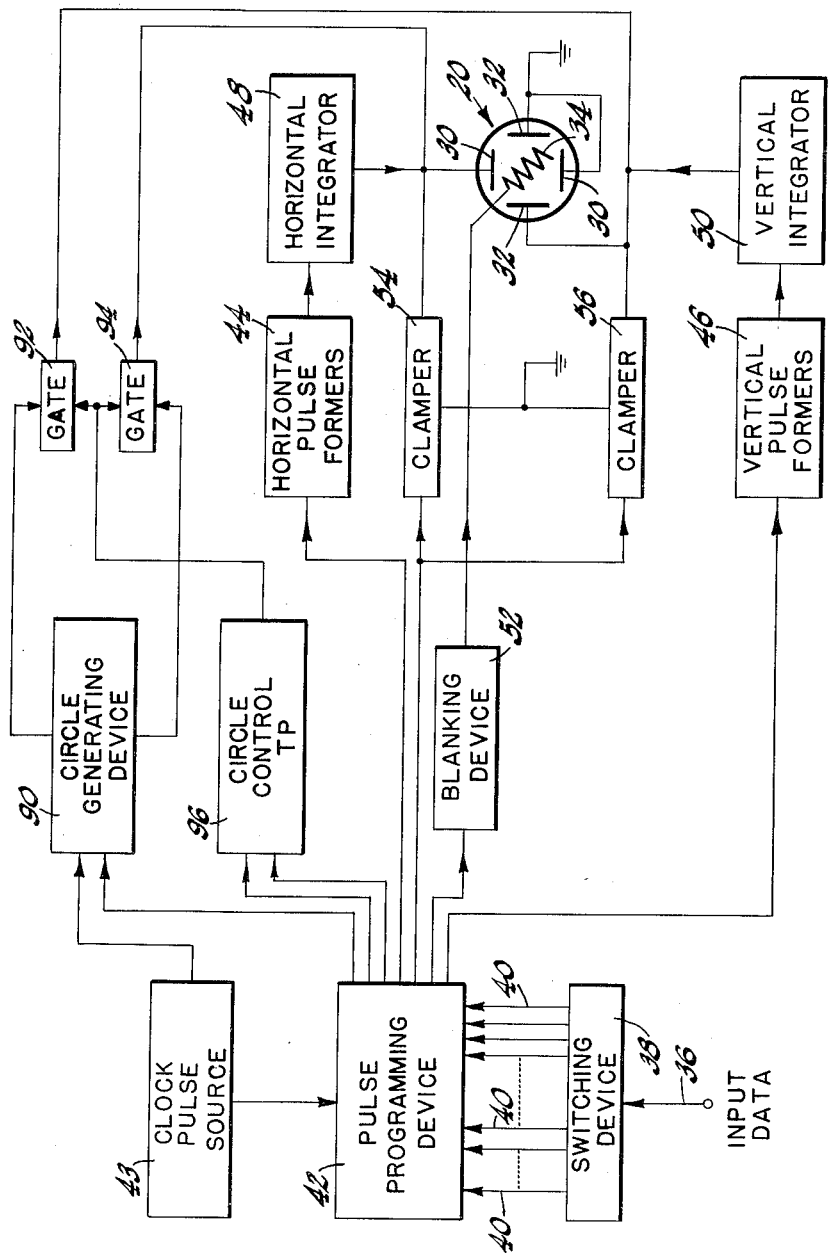

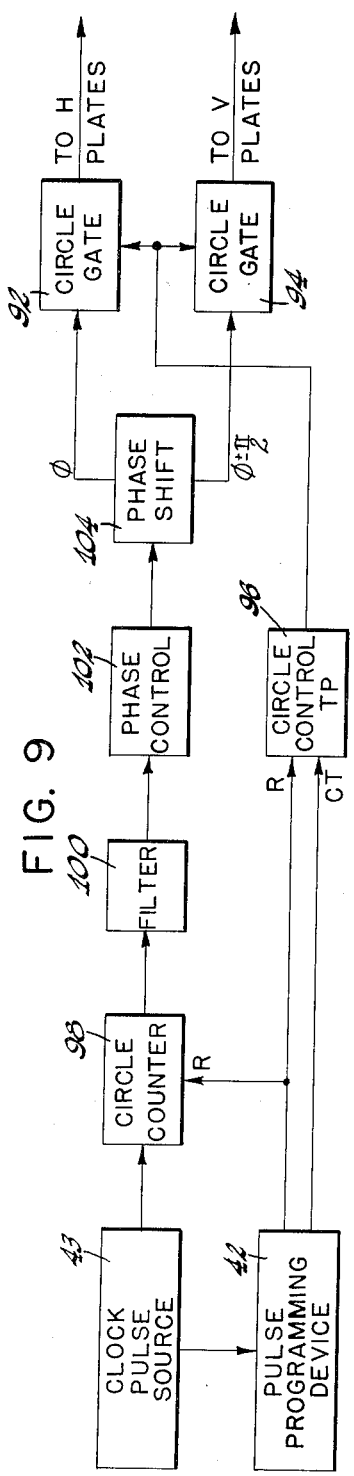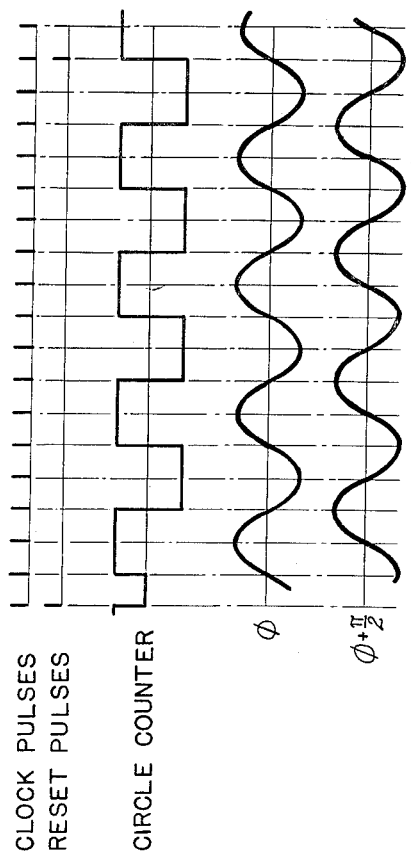

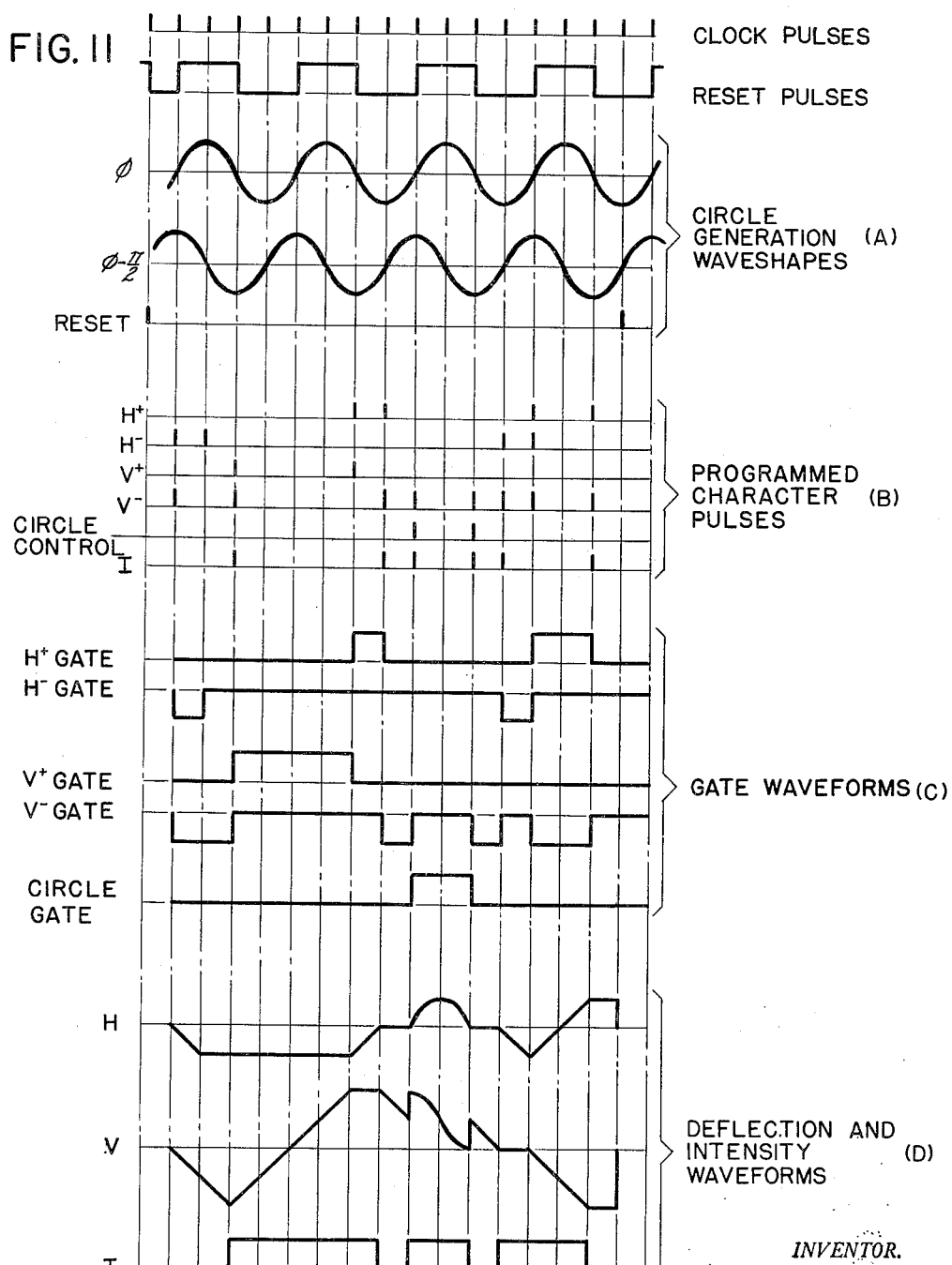

3,047,851
ELECTRONIC CHARACTER GENERATING AND
DISPLAYING APPARATUS
Russell B. Palmiter, Cohasset, Mass., assignor, by mesne assignments, to The Marquardt Corporation, a corporation of California
Filed Mar. 21, 1958, Ser. No. 723,030
13 Claims. (Cl. 340—324)

This invention relates to electronic apparatus for displaying alpha-numeric characters or geometric patterns on the face of a cathode ray tube. More particularly, it relates to improved apparatus for directly controlling the electron beam motion of a cathode ray tube to delineate the character to be displayed on the tube face.

Several systems have been proposed for displaying characters on the face of a cathode ray tube. One system employs scanning techniques such as used with television apparatus while another system utilizes specially fabricated cathode ray tube indicators which contain a mask for forming the electron beam in accordance with the cross-sectional shape of the character to be displayed. Scanning systems of the former type require complex associated apparatus while in the latter system, the nature and the number of characters capable of being displayed is limited to the number and type of configurations carried by the mask within the tube.

Another known system displays characters by dividing the characters to be displayed into a number of increments which are then successively assembled in proper sequence into a complete character. The increments are traced or drawn on the cathode ray tube face by sloping waveforms of measured duration. This system is described in Sheftelman U.S. Patent 2,766,444, wherein electronic delay lines are used to provide sequential distribution of pulses to the character wave forming generators which are representative of character increments to be formed on the tube face. Such a system requires relatively complex and somewhat redundant equipment, as a plurality of encoding stages are required to recode the basic information to be displayed into a form suitable for use with delay line distribution. Furthermore, many amplifying stages must be used in connection with the delay line to equalize the amplitude of the pulse outputs therefrom which further increases the complexity of the required circuitry. This invention relates to improvements in this system of character display.

Accordingly, the principal object of the invention is to provide a simplified and improved apparatus for displaying characters in geometric patterns on the face of a cathode ray tube by direct control of electron beam motion.

In the present invention, character waveforms for painting a character on the face of a cathode ray tube are selected, programmed and generated by employing known circuit units of the electronic computing art as components of the present invention. Such circuit units include AND units, OR units, and trigger pairs. An AND unit, by definition, yields an output pulse if input pulses are applied to all input terminals of the unit. An OR unit, by definition, yields an output pulse if any number of input stimuli are present. A trigger pair comprises a bistable circuit which is capable of being set to either of two states ("on" or "off"), and of being switched or triggered from state to state by application of an external signal.

In accordance with the invention, input data to be visually displayed in the form of discrete characters is encoded into representative digital or analog signals. Character control means are provided which decode the input data signals and select a desired character to be displayed from the many characters or symbols available in a character programming device. The programming device is adapted to generate a unique set of gating pulses for each character selected. A display generating unit operative in response to the application of these pulses generates selected horizontal and vertical sweep voltage waveforms and beam intensity control signals which are applied to the vertical and horizontal deflection plates and intensity control grid of the display tube to cause the electron beam to trace the selected character on the face thereof.

In one of its specific embodiments, the invention may be readily applied as a readout device for large scale digital computers, such as the Univac Scientific Computer. It permits programming of intermediate check point results for temporary display to confirm the correct progress of the problem in the computer. When used in conjunction with a high speed camera, the invention provides a medium for high speed tabular readout of computer data. In general, the invention has application in any data processing system where there is a need for direct conversion from information in electrical form to a visual display.

For a better understanding of the invention, together with other and further objects thereof, reference is made to the following detailed description taken in connection with the accompanying drawings, in which:

FIG. 1 is a diagrammatic illustration of the manner in which a character is drawn upon the face of a cathode ray tube.

FIG. 2 illustrates a portion of one alpha-numeric symbology which may be displayed by an embodiment of the invention.

FIG. 3 illustrates a portion of another alpha-numeric symbology which may be displayed by a modification of the invention.

FIG. 4 is a block schematic diagram of one embodiment of the present invention.

FIG. 5 is a block schematic diagram of the pulse programming and master pulse forming units of the embodiment shown in FIG. 4.

FIG. 7 shows a modification of the pulse programming and master pulse forming units of FIG. 5.

FIG. 8 illustrates a modification of the invention for generating a display of the symbology shown in FIG. 3.

FIG. 9 is a block schematic diagram of the circle generating device of FIG. 8.

FIG. 10 shows a series of plots of the pulse trains and wave forms which are present at various points in the elements of the invention shown in FIG. 9.

FIG. 11 shows a series of plots of activating pulse trains, sloping and curved waveforms which are present at various points in the elements of the invention shown in FIG. 8.

Figure 6:
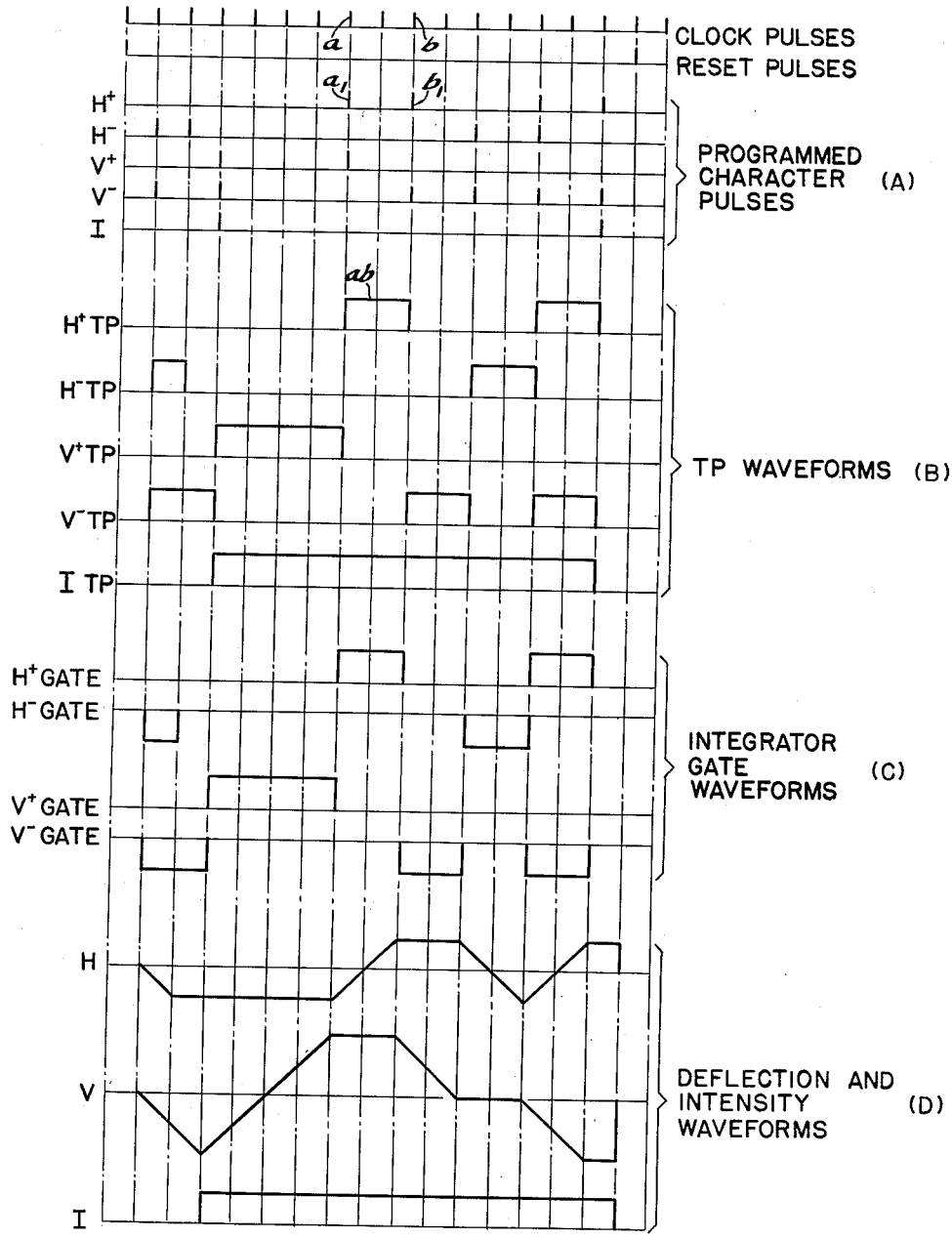
FIG. 6 shows a series of plots of activating pulse trains and sloping wave forms which are present at various points in the elements forming the embodiment of FIG. 4.

Referring now to the drawings, the apparatus for displaying characters includes at least one cathode ray tube 20 (FIG. 1) capable of having selected characters traced or drawn upon its face 22. The characters are drawn by controlling electron beam 24 issuing from gun 26 in such a manner as to cause spot 28 of beam 24 to follow the path necessary to delineate a selected character, such as a letter R shown on face 22. The control of beam 24 may be performed in any suitable manner. For illustrative purposes, the tube shown in FIG. 1 has electrostatic deflection plates 30, 32 for controlling the horizontal and vertical excursions, respectively, of the electron beam.

In general, the characters to be displayed are formed by applying a controlled combination of waveforms to deflection elements 30, 32. Blanking means, connected to the usual intensity control grid 34, are provided to selectively apply blanking signals thereto and preclude the display of prepartory and redundant strokes in the character forming process, as will be described in more detail hereinafter. By dividing each character to be traced into a convenient number of increments and by applying a pair of waveforms which define each increment to the horizontal and vertical deflecting electrodes, respectively, any selected character may be traced upon the face 22 of tube 20. The voltage waveforms applied to the deflection system have selected polarities, amplitudes and rates of change of amplitude to cause proper tracing of a chosen character by electron beam 24. The characters thus generated may be formed from combinations of horizontal lines, vertical lines and diagonal lines, or by combinations of horizontal, vertical, diagonal and curved lines.

FIG. 2 shows a portion of one alpha-numeric symbology which may be obtained by operation of the apparatus of the present invention. FIG. 3 shows selected characters of a similar symbology which may be obtained by operation of another embodiment of the present invention to provide curved lines in additional to the horizontal, vertical and diagonal lines. It is, of course, understood that innumerable, geometric patterns for representing other information may be obtained if desired.

The present invention is particularly directed to apparatus for translating input data representing the desired character to be traced, into selected waveforms which are adapted to cause the cathode ray tube to write the desired character. The input data may be either digital in nature, as received from a digital data storage register, or analog in nature, such as varying voltage level on an input line.

In FIG. 4 the elements comprising one embodiment of the present invention are shown in general block schematic form. Each unit of information of interest, generally appearing as a single voltage on a selected line or a group of two related voltages representing a numerical digit in binary form, is applied on an input line 36 to a switching device 38 which is adapted to classify the input information into a plurality of selected categories which, in the present invention, would be one of the characters in the alpha-numeric symbology. In operation, switching device 38 translates the input signal into discrete control signals for selecting a desired character. Switching device 38 may be a conventional diode matrix selector and if the input information is in binary form would be of the binary to decimal type.

It will be obvious to those skilled in the computing art that a plurality of flip-flop circuits or a shift register could be connected to input line 36 of switching device 38 and such units so manipulated by a train of information data pulses that switching device 38 will be caused to emit a signal representative of the character selected to be traced on tube face 22. A plurality of lines 40, each associated with one of the characters selected by switching device 38, are connected to a pulse programming device 42 and are adapted to transmit the control signal thereto representing the character selected. In response to reception of the charcter selecting signal from one of the lines of switching device 38, pulse programming device 42, described in more detail hereinafter, selects a sequence of horizontal pulses, vertical pulses, and intensity blanking pulses from an equally spaced train of clock pulses supplied by a conventional clock pulse source 43 which may be, for example, a free-running, multi-vibrator. These horizontal and vertical deflection pulse trains are passed through horizontal and vertical pulse formers 44, 46, respectively, which shape the pulses in a manner suitable for driving integrator circuits 48, 50, respectively. The waveforms generated by integrator circuits 48, 50 are formed generally from vertical, horizontal and sloping components which are applied to the deflection system of cathode ray tube 20.

Pulse programming device 42 also feeds a pulse train, in proper sequence with the horizontal and vertical pulse trains, to a blanking device 52 which, in response thereto, generates a sequence of square waves for enabling electron beam 24 for only those portions of the character tracing process which are chosen to be visually displayed. Clamp units 54, 56 are respectively connected ot horizontal and vertical integrators 48, 50 and when actuated by pulse programming device 42, operate to discharge any residual signal on the output of integrators 48, 50 just prior to the generation of a character. Clampers 54, 56 insure that each character is started from the same initial position on the face 22 of cathode ray tube 20 as, for example, point Y in the center of the tube face. Integrators 48, 50, clampers 54, 56 and blanking device 52 may be any of the well-known circuits commonly used in the cathode ray art to perform the functions just described.

In order to provide a better understanding of the operation of pulse programming device 42 and pulse formers 44, 46, reference is made to FIG. 5 which shows one embodiment of these elements of the invention in more detail. A series of equally spaced clock pulses provided by clock pulse source 43 are fed to a stroke counter 58 which attains a unique state; that is, it presents a different combination of output conditions to its output terminals for each new clock pulse applied to its input. Each of these unique states identifies one of the strokes which defines an increment of the character being traced. For example, it can be seen from FIGS. 1, 2, and 3 that the increments for all alpha-numeric characters and many geometric patterns may be generated with a total of fifteen strokes, provided that the characters are formed from an electron beam rest position designated as Y (FIG. 1). If only fifteen strokes are needed, then the stroke counter may take the form of a simple, four-stage, binary counter which may attain sixteen unique states as is well-known in the art. Counter 58 therefore may have four pairs of output lines or eight wires 60 connected to each of a plurality of character matrices 62 for applying thereto the sixteen possible combinations of output states.

Character matrices 62 form a decoding means for translating the sixteen binary coded output states of counter 58 into sixteen discrete output pulses, selectively arranged in a timed sequence. Matrices 62 may comprise diode matrices, magnetic storage core matrices, resistor matrices or any other matrix well-known in the art. One matrix 62 is employed for each symbol which is to be displayed, although for purposes of simplifying the drawings only five matrices are indicated therein. Character matrices 62 also have inputs connected by means of lines 40 to the outputs of switching device 38. Choice of a specific character to be displayed is effected by actuating a selected line 40 as, for example, by applying a supply voltage to a selected matrix 62 through the selected line 40, all other such lines being grounded.

Each character matrix 62 has five output terminals, each respectively connected by means of lines 66 to each of five logical AND gating circuits 68, 70, 72, 74 and 76. The stroke identifying pulses, selected from the sixteen possible pulse positions comprising a pulse train for a selected character are fed from their designated output terminals of matrices 62 by means of lines 66 which carry all pulses from like terminals to their respective AND gates 68, 70, 72, 74 and 76. Pulses from clock pulse source 43 are also fed to each of AND gates 68, 70, 72, 74 and 76 and form the other input to each of these five control circuits. The clock pulses establish a common time reference for the operation of each gating circuit. Therefore, the output signals of the AND gates 68, 70, 72, 74 and 76 are five sets of master pulse trains, programmed as prescribed by the internal wiring of a selected character matrix 62, and which define the length of the H+, H—, V+, V— and intensity pulses generated by pulse formers 44, 46 and blanking device 52 respectively.

The selectively spaced pulses forming a unique pulse train output from each of AND gates 68, 70, 72, 74 and 76 are fed to the inputs of associated trigger pairs 44a, 44b, 46a, 46b and 52a. These trigger pairs, which may be conventional, bistable multi-vibrators, are units included in horizontal and vertical pulse forming units 44, 46 and in blanking device 52. Trigger pairs 44a and 44b provide pulses of suitable length and amplitude for integration by horizontal integrator 48. Trigger pair 44a is connected to a gating circuit 44c which allows its H+ output pulse to pass to horizontal integrator 48. Trigger pair 44b is connected to gating circuit 44d which allows its H− output pulse to pass to horizontal integrator 48. The output pulses of trigger pairs 46a and 46b correspondingly drive vertical integrator 50 through gating circuits 46c, 46d which, respectively, allow the V+ and V− pulses generated by the trigger pairs to pass to vertical integrator 50.

In order to more clearly understand the operation of the embodiment of the invention shown in FIGS. 4 and 5, the operation of the apparatus disclosed therein will now be described in connection with the generation of the letter R. For illustrative purposes, assume that the characters to be displayed are formed from combinations of two horizontal strokes and four vertical strokes, as shown in FIGS. 1 and 2. Further assume that the integrator clampers 54, 56 have operated and all trigger pairs 44a, 44b, 46a, 46b and 52a have been reset to their "off" states by means described in more detail hereinafter, just prior to the initiation of the symbol to be described. Finally, assume that the initial or rest position of the electron beam is at Y, that positive horizontal deflection voltages correspond to a beam deflection from left to right, as viewed on the face 22 of cathode ray tube 20 and that positive vertical deflection voltages correspond to beam deflections from bottom to top of the character as viewed on the face 22 of the cathode ray tube. Negative horizontal and vertical deflection voltages correspond to beam motions in the opposite directions, respectively.

When pulses in the form of a binary code or an analog voltage are fed to input terminal 36 indicating that the letter R is to be traced, switching device 38 activates the R character matrix 62 by ungrounding or raising the potential of line 40 connected to the R matrix 62 as compared with the potential of the other lines 40 connected to the other matrices 62. The R character matrix 62 then distributes a sequence of pulses, selectively spaced according to the matrix wiring, to AND gates 68, 70, 72, 74 and 76, as it is successively switched through the sixteen stroke counts provided in binary encoded form by stroke counter 58. AND gates 68, 70, 72, 74 and 76 enabled by the coincidence of the pulses from matrix 62 and pulses from clock pulse source 43 generate the five trains of master pulses shown in FIG. 6a. As the outputs of AND gates 68, 70, 72, 74 and 76 are connected to the "center trip," CT, or binary counting input of associated trigger pairs 44a, 44b, 46a, 46b and 52a and since all trigger pairs have been reset to the inactive state prior to character generation, the first master pulse in a sequence of master pulses applied to a given trigger pair will cause a signal to appear at the output thereof. This signal will be maintained at a constant level by the trigger pair until it receives the second pulse in a sequence of master pulses fed to its input, which will return it to its initial or inactive stage. Each succeding master pulse pair will likewise alternately turn on the trigger pair output and then turn it off.

The relation between trigger pair outputs and corresponding master pulse inputs is illustrated in FIGS. 6a, 6b. For example, master pulses $a_1$ and $b_1$, corresponding in time to clock pulses $a$ and $b$ (FIG 6(A)) will respectively turn trigger pair 44a on and off so that pulse $ab$ appears at its output.

The trigger pair outputs drive integrator gates 44c, 44d, 46c, 46d which provide means for obtaining deflecting waveforms of either polarity from the integrators. These gate waveforms are shown in FIG. 6(C) and the resulting integrator outputs, which are the beam deflecting voltages, are shown in FIG. 6(D).

These voltages trace out the letter R as follows. Beginning at the first instant from the rest position Y of the beam, negative sloping voltages are applied to both the horizontal and vertical deflection plates 30, 32 for one clock pulse interval or stroke. This stroke moves the beam from position Y to a point midway between T and V. At this time, the horizontal deflection voltage obtains a steady value, while the vertical deflection voltage continues to go negative, bringing the beam to point T. During these two preparatory strokes, the electron beam 24 has been biased off by a constant potential applied between electrodes 26 and 34. At the beginning of the third stroke, the intensity trigger pair 52a is enabled. The output waveform therefrom is applied to these electrodes in a fashion to unblank the beam 24.

The horizontal deflection voltage now remains constant, while the vertical deflection voltage rises at a constant rate for four stroke intervals, bringing the beam to the point X, thus painting a vertical line on the face 22. The vertical deflection voltage now remains constant, while the horizontal deflection voltage changes in a positive direction bringing the beam to point U. Next, the horizontal voltage remains constant, while the vertical deflection voltage changes at a constant rate in a negative fashion, bringing the beam to the point W. The vertical deflection voltage now remains constant, while the horizontal deflection voltage changes in a negative direction for two strokes to bring the beam to point V. Finally, the horizontal deflection voltage changes in a positive direction while the vertical deflection voltage changes in a negative direction to complete painting the letter R by deflecting the beam from the point V to the point Z. At the instant that this stroke is completed, the intensity enabling waveform is removed and the beam is again blanked.

In this example of the generation and display of the character R, it developed that the intensity enabling waveform remained on continuously from its initiation until its termination. It will be obvious that this is not necessarily required; the intensity enabling waveform may be turned on and off as required for a specific character.

The last, or sixteenth pulse, in the character pulse train sequence may be employed to actuate the clampers 54, 56 to discharge the integrators and to reset all trigger pairs. This establishes the initial beam position for the next character. In this embodiment of the invention, this pulse has been shown derived from the turnover of the high order stage in the stroke counter 58. It may also be programmed in the character matrices 62 or derived by other means.

From the foregoing description, it will be clearly evident that all characters can be formed by suitable combinations of horizontal, vertical, and diagonal strokes, the latter being obtained by simultaneous horizontal and vertical deflection.

The embodiment of the pulse programming device shown in FIG. 4 may be modified as shown in FIG. 7 to utilize a conventional scalar counter instead of a binary counter for uniquely supplying each of sixteen pulses to a separate line. For purposes of illustration, the scalar counter is shown and described in the form of a serial shift register. The serial shift register may comprise a series of trigger pair stages, magnetic core storage stages or other serial counters well-known in the art. Such a scalar counter, generally indicated at 80, has a plurality of output lines 82 which are sixteen in number when a sitxeen pulse program is utilized to generate a desired character. The shift register 80 is preferably of the type which has a plurality of serially connected stages each of which may be set to one of two possible states and which are so connected that when one of the stages is set to one of its given states, the remaining stages are reset to the other state. Furthermore, the output lines 1—16 are so connected to the respective shift register stages that a pulse appears on each line as the state initially stored in stage 1 is transferred from the like-numbered stage to the next stage. Thus, when pulses from clock pulse source 43 are fed into shift register 80, the value or "state" initially stored in the left-hand stage is transferred down the register to the right one stage at a time for each shift pulse received. Therefore, when the first clock pulse transfers the signal from stage 1 to stage 2 and changes the state of stage 2 to that previously held by stage 1, a pulse will appear on output line 1. Accordingly, one pulse will appear on each output line in succession.

Lines 82 are connected to a plurality of character combining circuits 84 with one character combining circuit associated with each character which it is desired to display. The character combining circuits are connected to lines 40 of switching device 38 and are selectively enabled thereby as previously described in connection with the embodiment of the pulse programming device shown in FIG. 4. Each of the combining circuits 84 may comprise five sets of logical OR gates such as diode OR gates, capacitance combining circuits, or any other OR gate known in the art. The combining circuits are pre-wired to mix on to each of the five output lines the desired sequence of program pulses, such as, for example, the pulse program previously described and illustrated in connection with the tracing of the letter R.

Thus, referring to FIG. 6, to generate pulse $ab$ as shown in FIG. 6(B) for the H+ channel, the pulses carried by lines 82 from outputs 7 and 9 of shift register 80 would be combined through appropriate OR circuits in "R" combining circuit 84 so that pulses representing $a_1$ and $b_1$ would appear in proper time sequence at the input of H+ trigger pair 44a. The outputs of combining circuits 84 are connected to trigger pairs 44a, 44b, 46a, 46b and 52a as described heretofore in connection with the embodiment shown in FIG. 4. The apparatus from that point on operates as has been previously described. When the end of a character sequence is reached, the output pulse from the sixteenth stage of shift register 80 appearing on a designated line 82 may be used to actuate integrator clampers 54, 56 and reset the register to its initial condition for display of the next character and also resets the wave forming trigger pairs 44a, 44b, 46a, 46b and 52a.

Another embodiment of the invention suitable for generating the combined stroke symbology such as illustrated in FIG. 3 is shown in FIG. 8. The embodiment shown therein may include the elements previously described and additionally includes a circle generating device 90 capable of causing an electron beam to describe a circle on the face 22 of the cathode ray tube 20 and further includes gating units 92, 94 for turning on or off the circle generating signals in response to programmed information from pulse programming device 42. Gates 92, 94 are actuated by the pulse programming device 42 through a circle control trigger pair 96 which is actuated in a manner described heretofore in connection with trigger pairs 44a, 44b, 46a, 46b and 52a.

Circuits for generating circles on the face of cathode ray tubes are well-known in the art. However, in order to provide a better understanding of the operation of the circle generator in connection with the other elements of the invention, a suitable circle generating device 90, shown in more detail in FIG. 9, will now be described. The embodiment shown therein contemplates that a selected portion of a circular trace on the cathode ray tube 20 will be formed by applying a pair of sine wave signals, 90° out of phase with respect to each other, to the horizontal and vertical deflection plates 30, 32, respectively, of tube 20. This may be accomplished by feeding the clock pulses from clock pulse source 44 to a circle counter 98, which may be a two-stage binary counter whose output pulses have the form shown in FIG. 10. In order to insure that the circular sweep will always start from the same initial point, a reset pulse, which may be the sixteenth pulse from the programming device 42, as previously described, establishes the initial position of the circle counter 98 prior to every character sequence.

The square wave output of the binary circle counter 98 is shaped to a sine wave form by a suitable filter 100. The sine wave output of this filter is fed through a phase controlling circuit 102 which permits adjustment of any point on the generated circle to correspond precisely to a selected clock pulse. The output of the phase control 102 is connected to a phase shift network 104 so that two sine wave signals of equal amplitude, but 90° out of phase with respect to each other, are derived therefrom. The two phased sine waves may then be applied to the horizontal and vertical deflection system of the cathode ray tube 20 under the control of program device 42 by means of the circle control trigger pair 96 and gating circuits 92, 94. The circle control trigger pair 96 is reset to "off" position prior to the start of each character, such as, for example, by the sixteenth programming pulse from programming device 42 to prevent a signal from then passing through the horizontal and vertical circle gates 92, 94.

When it is desired to paint a circular trace upon the face 22 of cathode ray tube 20, an appropriate pulse from programming device 42 enables the circle control trigger pair 96, which in turn activates gates 92, 94, thereby permitting the two sine wave signals to pass to the deflection plates 30, 32. At a predetermined time, a second trigger pulse from programming device 42 will re-trigger the circle control trigger pair 96, reestablishing it to its initial condition and turning off circle gates 92, 94. The sine waveforms, shown in FIG. 10, illustrate the two output signals from the phase shift circuit 104 with the 90° phase relation established with reference to clock pulses from pulse source 43. The two sine waves illustrate the condition which exists when the phase control circuit 102 and phase shift circuit 104 adjust the "0" point and each succeeding 90° point on both sine waves to correspond precisely to the master clock pulses.

The operations required and the deflection waveforms necessary to generate the letter "R" in accordance with the symbology shown in FIG. 3 will now be described. In order to simplify the description, it may be assumed that the conventions previously used for deflection directions and deflection potential polarities again apply. It may be further assumed that the phase of the circle generating sine waveform is adjusted by means of phase control 104 so that the circle deflecting signals are equivalent to a beam position of 12 o'clock in the generated circle, coincidental with the occurrence of the first pulse in the character pulse train. It may be further assumed that the direction of the circular sweep is clockwise when viewed on the face of the cathode ray tube 20 and that one linear stroke or clock pulse interval corresponds precisely to 90° of circular arc.

Typical waveforms for generating the character "R" in accordance with the symbology of FIG. 3, are shown in FIG. 10. FIG. 11a illustrates the relationship between the clock pulses, the output of circle counter 98, and the two sine waves displaced 90° apart. In order to enforce the definition for circle generation given above, the horizontal deflection sine wave is denoted as $\phi$, and the vertical deflection sine wave is $$\phi - \frac{\pi}{2}$$

FIG. 11(B) shows the programmed character pulses, derived from pulse programming device 42 in the same manner as previously described, except that one additional output line 66 (FIG. 5) is provided for each character. This additional output line contains the pulse program for the circle control trigger pair 96 (FIGS. 8, 9) as previously described. Waveforms for the H+, H−, V+, V− and intensity trigger pairs 44a, 44b, 46a, 46b, and 52a have been omitted from FIG. 11 since their function is identical to that described previously. FIG. 11(C) shows the H+, H−, V+, V− integrator gate waveforms which function in the same manner as previously described, and the circle gate waveform which enables the sine wave signals to pass through the circle gates 92, 94 to the deflection plates of tube 20.

FIG. 11(D) shows the resulting sequence of deflection and intensity waveforms which may be used to generate the character "R." It will be clearly evident that the linear portions of the character may be formed in the same fashion as previously described. For the purpose of this illustration, the same sequence of strokes from the initial position Y may be used. Therefore, the generation of this character is identical to that previously described up to the point P. When the beam has reached this point, the intensity gate 52 is turned off, inhibiting stroke tracing, and the vertical deflection voltage is decreased one stroke length while the horizontal deflection voltage remains steady. The blanked beam advances to the point S. At the beginning of the next stroke interval, the intensity control grid 34 turns on the beam 24 and the circle gate circuits 92, 94 are enabled by the circle control trigger pair 96, permitting the two sine wave signals to pass to the deflection plates with the waveforms shown in FIG. 10(D), while the horizontal and vertical integrator outputs remain constant. At the end of two stroke intervals, or 180° of circular arc in the displayed character, the intensity waveform is again turned off, blanking the electron beam. During the next stroke interval, the horizontal integrator output remains constant while the vertical integrator output produces a negative stroke carrying the blanked beam to position Y. At this point, the intensity waveform is again turned on and the remainder of the character may be traced out in the fashion previously described.

It will be seen that for the apparatus described, the ratio of horizontal or vertical stroke length to diagonal stroke length is 1 to 1.41, and the ratio of horizontal or vertical stroke length to circular stroke length is 1 to 1.57. This arrangement provides a minimum of variation between writing speeds for the various types of strokes. It is important to maintain minimum sweep speed ratios among the various strokes in order to maintain uniform intensity in different parts of the character.

While the present invention has been disclosed by means of specific illustrative embodiments thereof, it would be obvious to those skilled in the art that other changes and modifications in the means of operation described or in the apparatus, may be made without departing from the spirit of the invention as defined in the appended claims.

I claim:

1. In an electronic character display device of the type adapted to trace and display selected alphanumeric characters on the face of a cathode ray tube having vertical and horizontal deflection controls and having an intensity blanking control, character line segment, wave form generating apparatus, comprising, means for selecting a character to be displayed, said character comprising a combination of character line segments, means for generating a plurality of equally spaced timing pulses, pulse programming means connected to said pulse generating means and operative in response to selection of a character by said character selecting means for selecting at least one sequence of discrete pulses representative of the line segments of a selected character to be displayed, gating means for producing a gated wave form having at least two levels of voltage magnitude, each of said levels having time periods of duration, said wave form being a function of the selected character, said function being determined solely by the said time periods of said levels, said gating means being operatively connected to said pulse programming means, and means for deriving from said gated wave form a second wave form whose instantaneous amplitudes are a function of said character segments and are variable during the time periods of at least one of said levels.

2. The combination of claim 1 wherein said means for deriving said second wave form constitutes an integrator.

3. The combination of claim 1, wherein said gating means comprises a first gate for the horizontal components of said character line segments and a second gate for the vertical components of said character line segments.

4. In an electronic character display device of the type adapted to trace and display selected alphanumeric characters on the face of a cathode ray tube having vertical and horizontal deflection controls and having an intensity blanking control, character line segment, wave form generating apparatus, comprising, means for selecting a character to be displayed, said character comprising a combination of character line segments, means for generating a plurality of equally spaced timing pulses, pulse programming means connected to said pulse generating means and operative in response to selection of a character by said character selecting means for selecting at least one sequence of discrete pulses representative of the line segments of a selected character to be displayed, a first gating means for producing a first gated wave form representative of the positive horizontal components of said character, a second gating means for producing a second gated wave form representative of the negative horizontal components of said character, a third gating means for producing a third gated wave form representative of the positive vertical components of said character, and a fourth gating means representative of the negative vertical components of said character, all of said gating means being operatively connected to said pulse programming means and producing gated wave forms whose representation of their respective components is determined solely by the time period of said gates, said first and second gates being connected to a means for deriving a first output wave form whose instantaneous amplitude is a function of the horizontal components of said character segments, and said third and fourth gates being connected to a second means for deriving a second output wave form whose instantaneous amplitude is a function of the vertical components of said character segments.

5. The combination of claim 1 wherein the output of said wave form deriving means is applied to the deflection controls of a cathode ray tube.

6. In an electronic character display device of the type adapted to trace and display selected alphanumeric characters on the face of a cathode ray tube having vertical and horizontal deflection controls and having an intensity blanking control, character line segment, wave form generating apparatus, comprising, means for selecting a character to be displayed, said character comprising a combination of character line segments, means for generating a plurality of equally spaced timing pulses, pulse programming means connected to said pulse generating means and operative in response to selection of a character by said character selecting means for selecting at least one sequence of discrete pulses representative of the line segments of a selected character to be displayed, a first gating means for producing a first gated wave form having at least two levels of voltage and being a function of the horizontal components of said displayed character, said function being determined solely by the time periods of said levels, a second gating means for producing a second gated wave form having at least two levels of voltage and being a function of the vertical components of said displayed character, said function being determined solely by the time periods of said levels, each of said gating means being operatively connected to said pulse programming means, a first linear voltage generating means connected to said first gating means and having a first output voltage whose instantaneous amplitudes are a function of said character and are variable during the time periods of at least one of said levels, means to apply said output voltage to the horizontal deflection controls of said cathode ray tube, a second linear voltage generating means connected to said second gating means and having a second output voltage whose instantaneous amplitudes are a function of said character and are variable during the time periods of at least one of said levels, and means to apply said second output voltage to the vertical deflection control of said cathode ray tube.

7. The combination of claim 1, wherein the means for deriving said wave form comprises a linear generator whose output has at least two components each having a slope constant in amplitude but variable in sign.

8. The combination of claim 1, wherein the means for deriving said wave form comprises a linear generator whose output has at least three components each having a different slope constant in amplitude but variable in sign.

9. The combination of claim 1, wherein said means for deriving a second wave form comprises a linear generator whose output has a slope variable in both sign and amplitude between the limits of zero and infinity and has at least one finite value between said limits.

10. The combination of claim 6, wherein each of said first and second output voltages have a slope variable in both sign and amplitude between the limits of zero and infinity and have at least one finite value between said limits.

11. In an electronic character display device of the type adapted to display selected characters on the face of a cathode ray tube having vertical and horizontal deflection controls and having an intensity blanking control, linear character wave form generating apparatus, comprising, means for selecting a character to be displayed, means for generating a pluraliy of equally spaced timing pulses, pulse programming means connected to said pulse generator and operative in response to selection of a character by said character selecting means, said pulse programming means having means to select a discrete sequence of pulses dividing said character into sequential linear segments, gating means connected to said pulse programming means and having a gated signal output having at least two voltage levels, said signal output being a function of said selected linear segments, said function being determined solely by the time period of said levels, and linear generating means operatively connected to said gating means and having means for producing a voltage wave form whose slope varies between the limits of zero and infinity and is a function of said character segments.

12. The combination of claim 11 wherein said slope includes at least one finite value between said limits.

13. The combination of claim 11 wherein said gated signal output has three voltage levels.

References Cited in the file of this patent

UNITED STATES PATENTS

| | | |
|---|---|---|
| 2,762,862 | Bliss | Sept. 11, 1956 |
| 2,784,251 | Young | Mar. 5, 1957 |
| 2,834,831 | Giffard | May 13, 1958 |
| 2,840,637 | McNaney | June 24, 1958 |
| 2,931,022 | Triest | Mar. 29, 1960 |

OTHER REFERENCES

Electronics, January 3, 1958, "Generating Characters," by Perry and Aho, pp. 72–75.